(12) United States Patent
Kubota et al.

(10) Patent No.: US 7,369,336 B2
(45) Date of Patent: May 6, 2008

(54) MASTER CARRIER FOR MAGNETIC TRANSFER

(75) Inventors: Hideyuki Kubota, Kanagawa (JP); Akito Kamatani, Kanagawa (JP); Masakazu Nishikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 260 days.

(21) Appl. No.: 10/895,313

(22) Filed: Jul. 21, 2004

(65) Prior Publication Data
US 2005/0024757 A1 Feb. 3, 2005

(30) Foreign Application Priority Data
Jul. 31, 2003 (JP) ............ P. 2003-284024

(51) Int. Cl.
*G11B 5/64* (2006.01)
*G11B 5/86* (2006.01)

(52) U.S. Cl. ............ 360/17; 428/826; 428/836; 428/141; 428/692.1

(58) Field of Classification Search ............ None
See application file for complete search history.

(56) References Cited

U.S. PATENT DOCUMENTS

| 6,347,016 | B1 | 2/2002 | Ishida et al. |
| 7,115,328 | B2* | 10/2006 | Nakamura et al. ......... 428/826 |
| 2002/0051307 | A1* | 5/2002 | Nishikawa et al. .......... 360/17 |

FOREIGN PATENT DOCUMENTS

| JP | 11-273070 A | 10/1999 |
| JP | 2001-126247 A | 5/2001 |

* cited by examiner

*Primary Examiner*—Kevin M. Bernatz
(74) *Attorney, Agent, or Firm*—Sughrue Mion, PLLC

(57) ABSTRACT

A master carrier for magnetic transfer having a data region and a servo pattern region that has a pattern of fine projections arrayed in the track direction thereof in accordance with the preformat signal information to be transferred onto an in-plane magnetic recording medium is disclosed. The data region has a projection formed of a material such as carbon-based material that differs from the material of the servo pattern region.

14 Claims, 6 Drawing Sheets

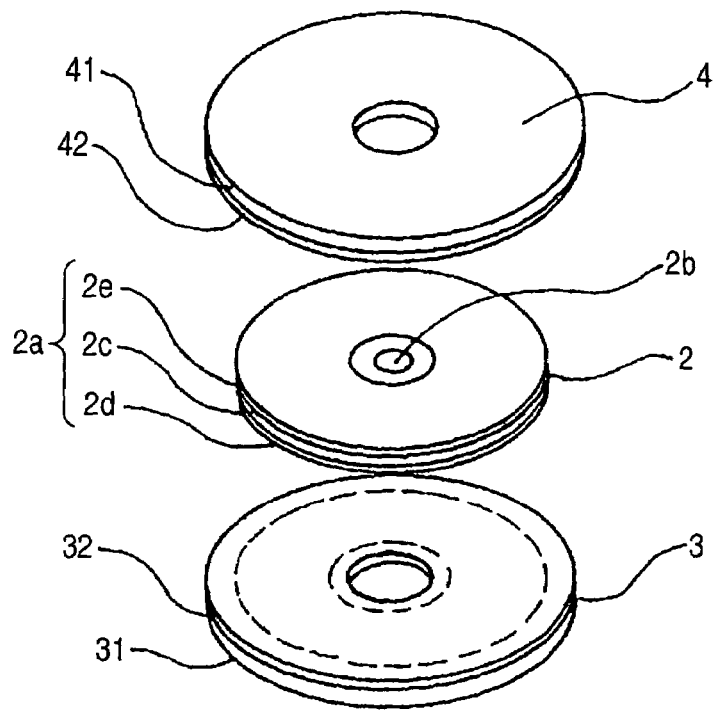
FIG. 1
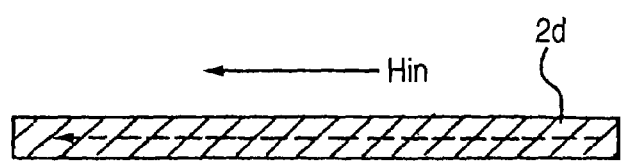
FIG. 2 (a)
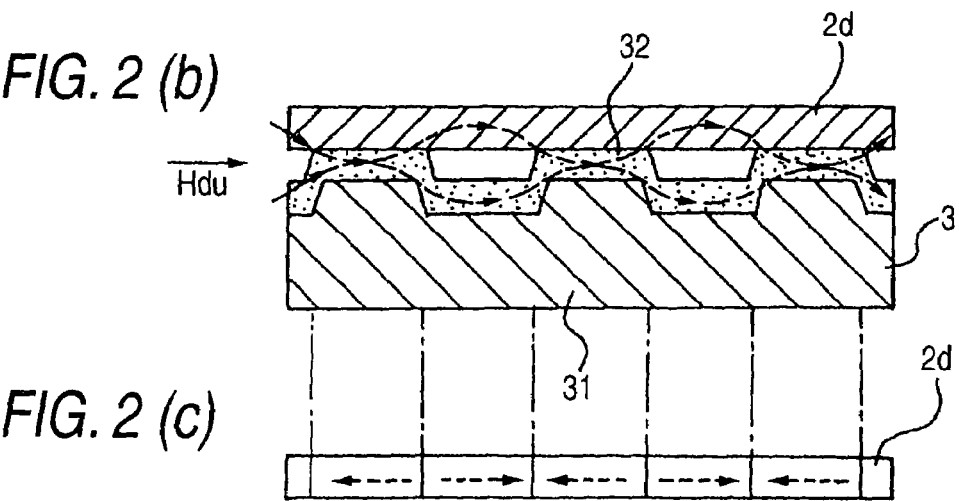
FIG. 2 (b)
FIG. 2 (c)

CONVENTIONAL *FIG. 6 (a)*
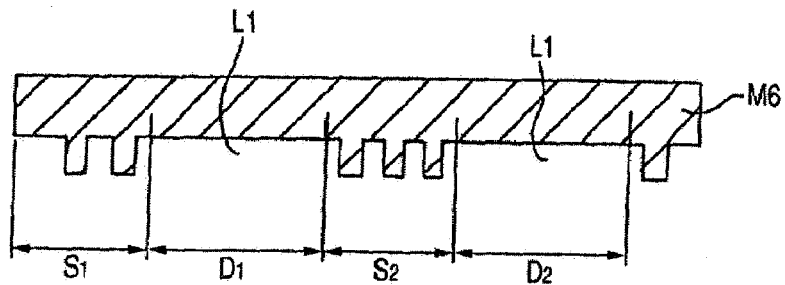
CONVENTIONAL *FIG. 6 (b)*
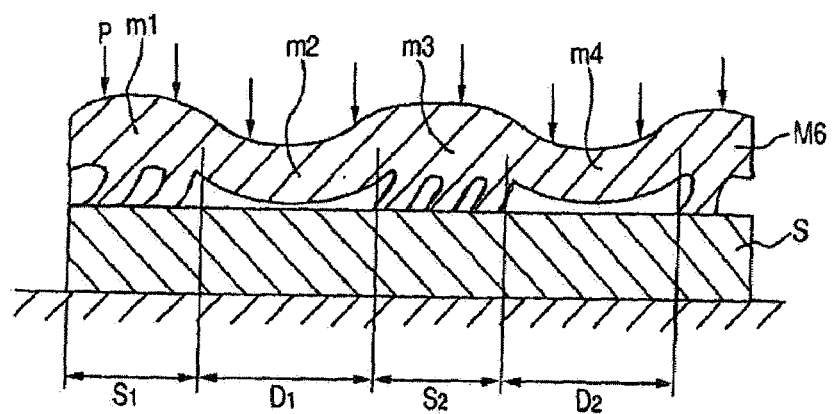

MASTER CARRIER FOR MAGNETIC TRANSFER

This application is based on Japanese Patent application JP 2003-284024, filed Jul. 31, 2003, the entire content of which is hereby incorporated by reference.

BACKGROUND OF THE INVENTION

1. Field of the Invention

The present invention relates to a master carrier for magnetic transfer, which has a projection pattern for digital information transfer to magnetic recording medium, and in particular to the projection pattern of such a master carrier.

2. Description of the Related Art

With the recent increase in information data in the art of magnetic recording media, generally desired are inexpensive, mass-storable and rapid-accessible media capable of recording many informations and preferably capable of reading out the necessary site within a short period of time. For example, high-density magnetic disc media are known that are used in hard disc devices and floppy (registered trade mark) disc devices. A tracking servo technique plays a significant role in realizing the mass storability of such media, which is for driving a magnetic head to accurately scan even narrow tracks and to reproduce signals as a high S/N ratio. Discs are preformatted to record tracking servo signals, address information signals and reproduction clock signals at predetermined intervals in one circle of each disc, and a recording head is so designed that it can read these preformatted signals and can therefore correct its own position to accurately run on the track of each disc.

In general, servo signals (servo patterns) include a preamble (synchronization signal), a gray code (track number signal) and a burst signal (head positioning signal) that are formed in that order from the top of a servo frame, and a data region follows their region. The burst signal has a part where it is recorded as shifted by ½ track width from the track center line, and the other servo signals are recorded on the track center line to a whole track pitch width. The data region is narrower than the recording width of servo signals, and a guard band part where no signal is recorded is formed in the area adjacent to the outer and inner tracks.

At present, every disc is preformatted one by one by recording the signals one by one thereon, using a dedicated servo recording device. For example, the servo recording device is equipped with a magnetic head that has a head width of about 75% of the track pitch. First, the magnetic head is kept in adjacent to a disc, and the disc is rotated once in that condition to thereby write a pattern thereon that corresponds to the outer ½ track width. Next, the magnetic head is moved inside by a half track pitch width of the disc, and a pattern that corresponds to the inner ½ track width is written on the disc in the next rotation thereof. In that manner, the one-track signal is formed on the disc.

The servo recording device is expensive, and takes a lot of time for preformatting discs with it. Therefore, the preformatting process takes a major part of the production cost of discs, and it is desired to reduce the cost.

Accordingly, a method of preformatting discs in a mode of magnetic transfer has been proposed, in place of preformatting them one by one for one by one track thereon. For example, U.S. Pat. No. 6,347,016 discloses magnetic transfer techniques. For magnetic transfer, a master carrier is prepared, which has a projection pattern corresponding to the information to be transferred onto magnetic disc media such as slave media, i.e., magnetic recording media. The master carrier is kept in intimate contact with a slave medium and a magnetic field for transfer recording is applied to them, whereby the magnetic pattern corresponding to the information (e.g., servo signals) that the projection pattern of the master carrier carries is recorded onto the slave medium. The process enables static recording, not changing the relative position between the master carrier and the slave medium. According to the process, therefore, accurate recording of preformat data on slave media is possible, and the time necessary for the recording may be extremely short.

For improving the transfer quality in the above-mentioned magnetic transfer process, it is important to solve the problem of how to keep the master carrier and the slave medium in intimate contact with no gap between them. In other words, if they are not kept in good intimate contact with each other, then no magnetic transfer may occur in some region. The magnetic transfer failure will cause signal failure of the magnetic information transferred onto the slave medium, and the transferred signal quality is thereby lowered, and when the recorded signal is a servo signal, then it could not satisfactorily attain its tracking function and the signal-reading reliability thereof may therefore lower.

FIG. 5 is a plan view for explaining the positional relationship between a servo pattern region and a data region of a magnetic transfer master carrier. In the drawing, M5 is a magnetic transfer master carrier; S1, S2, S3, S4, S5, . . . each are a servo pattern region; and D1, D2, D3, D4, D5, . . . each are a data region. In the drawing, the regions are drawn wide for better visibility. In fact, however, one region has a center angle of about 2 degrees. Further, the servo pattern region S1, . . . is drawn wider in some degree than the data region D1, . . . In fact, however, the difference between them is much larger than that in the drawing. FIG. 6, FIG. 7, . . . that are described below each show the cross-sectional view of FIG. 5 in the T1 direction thereof.

FIG. 6 is a cross-sectional view showing a condition of magnetic transfer onto a slave medium from a conventional magnetic transfer master carrier. (a) is the master form before transfer; and (b) is the master form during transfer.

In the drawing, M6 is a conventional magnetic transfer master carrier; S is a slave medium; S1 and S2 each are a serve pattern region; and D1 and D2 each are a data region. As seen in the drawing, the conventional magnetic transfer master carrier does not have a projection in the data region D1, D2, and therefore an air layer L1 is between the carrier M6 and the slave medium S.

In the magnetic transfer process illustrated, the master carrier and the slave medium are kept in contact with each other for preformat signal formation. As in FIG. 6(a), the magnetic transfer master carrier M6 is kept in contact with the slave medium S, and then the gap between them is degassed to be in the condition as in FIG. 6(b) in which an external pressure P is applied to the master carrier M6 and only the preformat signal projections are kept in contact with the slave medium. In this, therefore, the preformat signal projections undergo high-order distortion while they are in contact with the slave medium. Specifically, the sites m2 and m4 with no projection formed therein are warped and deformed, and therefore, the sites m1 and m3 with projections formed therein are influenced by the deformed sites, and are therefore deformed as in the drawing. As a result, accurate magnetic transfer onto the slave medium becomes impossible owing to the high-order distortion of the preformat signal projections, and the quality of the transferred slave medium is therefore low. In addition, the projections of the servo pattern region are also gradually changed and collapsed, and the material of the curved site is fatigued, and to that effect, the durability of the master carrier is problematic.

When the master carrier M6 is repeatedly brought into contact with the slave medium S, then the lubricant in the slave medium S and the contaminant in air may adhere to the master carrier M6. The lubricant and the contaminant thus having adhered thereto are difficult to remove from the master carrier, and also to that effect, the master carrier could not ensure good durability.

On the other hand, a different type of master carrier that does not form an air layer between it and a slave medium is known, for example, as in JP-A2001-126247 and JP-A11-273070. The master carrier of the type is so designed that the data region thereof is formed to the same height as that of the servo pattern region thereof in producing it, and a magnetic layer is embedded in only the servo pattern region, and, as a result, the height of the servo pattern region is made the same as that of the data region.

FIG. 7 is a cross-sectional view of a magnetic transfer master carrier common to JP-A 2001-126247 and JP-A 11-273070.

In the drawing, 50 is a servo pattern region of a magnetic transfer master carrier; 51 is a non-magnetic support; and 52 is a ferromagnetic thin film.

For producing the master carrier, a resist is applied to the surface of the non-magnetic support 51, exposed to light, developed and etched to form a groove pattern on the non-magnetic support 51, and a ferromagnetic thin film 52 is formed on it. Next, the remaining resist and the unnecessary ferromagnetic thin film are removed to obtain the servo pattern region 50 as in FIG. 7(a).

Specifically, the magnetic transfer master carrier 50 is so designed that its surface is flat and a ferromagnetic layer is embedded in it. When the master carrier is kept in contact with a slave medium on the side of the ferromagnetic layer thereof, then the two can be kept in intimate contact with each other with no gap between them, and ensure good magnetic transfer between them. Since the master carrier of the type has no projection on its surface, its durability is good and its life is long.

JP-A 2001-126247 and JP-A 11-273070 may clarify the constitution of the servo pattern region of the master carrier disclosed therein, but have no description relating to the data region thereof. From the production method for the master carrier, it may be presumed that the non-magnetic support 51 itself may serve as the data region of the master carrier. If so, the magnetic transfer master carrier having the servo pattern region and the data region presumed from Patent References 1 and 2 will be as in FIG. 7(b).

In FIG. 7 (b), M7 is a magnetic transfer master carrier comprising a servo pattern region and a data region; 51 is a non-magnetic support; 52 is a ferromagnetic thin film; S is a servo pattern region 50; and D is a data region. When the thickness of the master carrier in the servo pattern region is represented by d1 and those in the data region is represented by d2, then d1=d2.

The surface of the magnetic transfer master carrier M7 is flat as illustrated. Therefore, when this is kept in intimate contact with a slave medium, then no air layer is formed between the data region D and the slave medium. In that condition, this is free from high-order distortion that is caused by only the contact of the preformat signal projections with the slave medium as in FIG. 6. Accordingly, the master carrier of this type may ensure accurate magnetic transfer onto slave media, therefore having the advantages of good durability and long life.

However, the magnetic transfer master carrier M7 of FIG. 7 does not have a projection pattern in the servo pattern region thereof, and therefore the boundary between the magnetic region and the non-magnetic region is difficult to clarify. In particular, when magnetic powder adheres to the flat non-magnetic region, then this will rather interfere with accurate magnetic transfer onto slave media. Another problem with the master carrier M7 is that it requires a step of embedding the magnetic region 52 into the non-magnetic region 51.

Another type of magnetic transfer master carrier as in FIG. 8 may solve the problem. FIG. 8 is a cross-sectional view showing a condition of magnetic transfer onto a slave medium from a magnetic transfer master carrier. (a) is the master form before transfer; and (b) is the master form during transfer.

In the drawing, M8 is a conventional magnetic transfer master carrier; S is a slave medium; S1 and S2 each are a serve pattern region; and D1 and D2 each are a data region.

As seen in the drawing, the magnetic transfer master carrier M8 is characterized in that a projection T1, T2 is formed to be the entire data region D1, D2 thereof, and its height is the same as that of the projections in the servo pattern region S1, S2. Accordingly, when the master carrier of the type is attached to a slave medium, then an air layer like L1 as in FIG. 6(a) is not formed between it and the slave medium S attached thereto, like in the case of FIG. 7. Therefore, even when a pressure P is applied to the master carrier during magnetic transfer with it as in FIG. 6(b), there occurs no high-order distortion that may be caused by the contact of only the preformat signal projections of a master carrier to the adjacent slave medium. As a result, the master carrier of the type ensures accurate magnetic transfer with it, and has the advantages of good durability and long life.

However, the projection in the data region of the magnetic transfer master carrier of FIG. 8 is formed of the same magnetic support as in the servo pattern region thereof, and therefore, the master carrier of the type is unfavorable since the data region thereof may also undergo magnetic transfer at the same time when the servo pattern thereof is subjected to magnetic transfer onto slave media.

Accordingly, the master carrier must be specifically so designed that the data region thereof does not undergo magnetic transfer while the serve pattern thereof is subjected to magnetic transfer onto slave media. For it, for example, the servo pattern region and the data region of one and the same master carrier may be so synchronized that the master carrier may receive a magnetic field only in the servo pattern region thereof but not in the data region thereof while it is driven for magnetic transfer onto slave media. However, controlling the master carrier to that effect is complicated and troublesome.

Common to the two magnetic transfer master carriers of FIG. 7 and FIG. 8, another problem is that there exists no groove passing in the radial direction, in the boundary between the projections-having servo pattern region and the data region of the two.

The master carrier of the type as above, in which the projection of the data region is formed of the same non-magnetic support as in the servo pattern region and has the same height as that of the servo pattern region, has the advantage of good intimate contact with a slave medium with no gap between them, but naturally, it does not have any other function, such as a cleaning function of absorbing a lubricant released from a slave medium attached thereto.

Even when a flat master carrier is attached to a flat slave medium, the two could not always be in completely intimate contact with each other in the entire surface thereof, and air bubble islands may be formed in the area where air discharge by suction is delayed, and if so, they may rather cause magnetic transfer failure. The magnetic transfer master carriers of FIG. 7 and FIG. 8 could not repel such air bubbles.

SUMMARY OF THE INVENTION

Accordingly, it is an abject of the present invention to provide a durable master carrier for magnetic transfer having a long life, which enables good magnetic transfer onto slave media with no signal failure of magnetic information to be transferred onto them, and has a cleaning function of absorbing a lubricant released from a slave medium attached thereto. It is another object of the invention to provide a master carrier that, when it is attached to a slave medium, air hardly remains between them.

To achieve at least a part of the above objects, the invention provides a master carrier for magnetic transfer comprising a data region and a servo pattern region that has a pattern comprising a first projection and a depression, at least the first projection including a first material and being allayed in a track direction of the master carrier in accordance with a preformat signal information to be transferred to an in-plane magnetic recording medium, wherein the data region has a second projection including a second material, and the second material is different from the first material. Here, the term "depression" indicates a portion between one projection and another projection, therefore, a pattern having a projection and a depression formed on a support can be referred to a projection pattern.

In the preferred embodiment of the invention, the first material comprises a soft magnetic material and the second material comprises anon-magnetic material, and more preferably the second material comprises a carbon-based material or a chromium-based material. The second projection can be formed by a deposition.

It is preferred that the second projection substantially has same height as that of the first projection, and more preferably the second projection is 0.6 to 1.4 times as high as the first projection, and most preferably the second projection is 0.8 to 1.2 times as high as the first projection.

According to another embodiment of the master carrier for magnetic transfer of the invention, the data region partly has the second projection, in which the second projection comprises a non-magnetic material.

In still another embodiment of the invention, the master carrier for magnetic transfer has an interval along a border line between the servo pattern region and the data region disposed adjacent to each other.

To obtain a preformatted magnetic recording medium with no signal failure, the invention also provides a process of producing a preformatted magnetic recording medium, which comprises the steps of: preparing a magnetic transfer master, preparing a slave medium comprising a non-magnetic support having a magnetic recording layer thereon, initially magnetizing the magnetic recording layer of the slave medium to a predetermined direction, bringing a surface of the master medium into intimate contact with the magnetic recording layer of the slave medium at a predetermined pressure to form a conjoined body, and applying a transfer magnetic field to the conjoined body in a direction opposite to the predetermined direction, thereby obtaining the magnetic recording medium having the recorded data, wherein the magnetic transfer master comprising a data region and a servo pattern region, the servo pattern region comprising a non-magnetic support having a surface containing: a first projection comprising a first material; and depression, in accordance with a servo pattern, comprises a second projection including a second material different from the first material.

In the preferred embodiment of the invention, the first material comprises a soft magnetic material and the second material comprises anon-magnetic material, and more preferably the second material comprises a carbon-based material or a chromium-based material. The second projection can be formed by a deposition.

It is preferred that the second projection substantially has same height as the first projection, and more preferably the second projection is 0.6 to 1.4 times as high as the first projection, and most preferably, the second projection is 0.8 to 1.2 times as high as the first projection.

According to another embodiment of the process of producing a preformatted magnetic recording medium of the invention, the data region partly has the second projection, the second projection including a non-magnetic material.

In still another embodiment of the process of producing a preformatted magnetic recording medium of the invention, the magnetic transfer master has an interval along a border line between the servo pattern region and the data region disposed adjacent to each other.

In the data region of the master carrier of the invention, a projection is formed of a material, for example, a carbon-based material that differs from the material of the servo pattern region, by a deposition. Therefore, when the master carrier is kept in contact with a slave medium, then not only the preformat signal projections of the master carrier but also the projection in the data region thereof maybe contacted with the slave medium, and the master carrier is significantly prevented from being deformed. Since the projection in the data region is formed by a deposition, the latitude in selecting the material for the projection is broad.

A lubricant is used in hard discs and other media that serve as slave media. While such slave media are repeatedly contacted with the master carrier, the lubricant in them may move to the master carrier and may contaminate it. In the master carrier of the invention, the carbon film projection formed in the data region may have a cleaning function of absorbing the contaminant.

In the master carrier of the invention, a non-filmed region is formed between the projection in the servo pattern region and that in the data region. Therefore, when the master carrier is kept in intimate contact with a slave medium, the remaining air may run through the non-filmed region and may be sucked away through the end thereof. As a result, the intimate contacting the master carrier with a slave medium is improved. The improved intimate contact between the two prevents generating signal failure in magnetic transfer and improves the transferred signal quality.

BRIEF DESCRIPTION OF THE DRAWING

FIG. 1 is a perspective view showing a slave medium 2, and master carriers 3, 4.

FIG. 2 is a view showing a basic process of magnetic transfer onto a magnetic recording medium. FIG. 2(a) indicates a step of initial DC magnetization of a slave medium by applying thereto a magnetic field in one direction of the medium; (b) indicates a step of intimately contacting the slave medium with a master carrier followed by applying a magnetic field thereto in the direction opposite to the direction of the initial DC magnetic field; and (c) indicates a condition of the slave medium after the step of magnetic transfer thereto.

FIG. 6 is a cross-sectional view showing a condition of magnetic transfer onto a slave medium from a conventional magnetic transfer master carrier. (a) is the master form before transfer; and (b) is the master form during transfer.

DETAILED DESCRIPTION OF THE INVENTION

Figure 3:
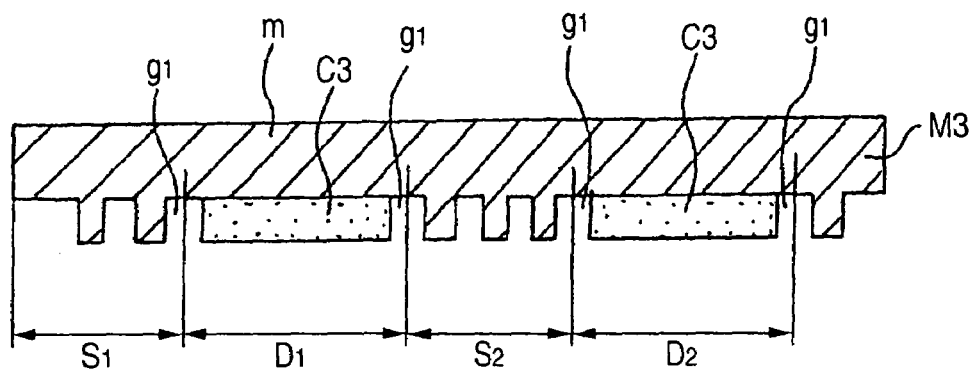
FIG. 3 is a cross-sectional view showing a condition of magnetic transfer onto a slave medium from the magnetic transfer master carrier of the first embodiment of the invention. (a) is the master form before transfer, and (b) is the master form during transfer.
Figure 3:
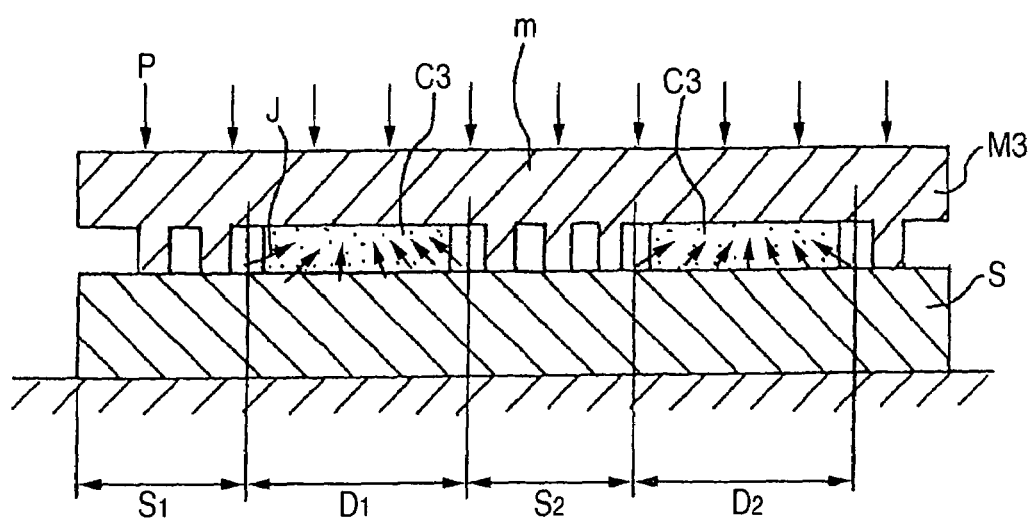

Embodiments of the invention are described in detail herein under with reference to the drawings attached hereto. The basic process of magnetic transfer of information onto a slave medium from a master carrier is described with reference to FIG. 1 and FIG. 2.

FIG. 1 is a perspective view showing a slave medium 2, and master carriers 3, 4. The slave medium 2 is, for example, a flexible disc with a hub 2b fixed in the center of a disc-shaped recording medium 2a, and the recording medium 2a has recording faces of magnetic layers 2d, 2e formed on both surfaces of a disc-shaped base 2a of a non-magnetic material such as flexible polyester sheet.

Formed of a rigid material, the master carriers 3, 4 are circular discs, and have, on one side thereof, a transfer information-carrying face that has a fine projection pattern to be intimately contacted with the recording faces 2d, 2e of the slave medium 2. The master carriers 3, 4 each have a projection pattern for the lower recording face 2d and the upper recording face 2e, respectively, of the slave medium 2. With reference to the master carrier 3, the projection pattern is formed in the doughnut region surrounded by the dotted line in the drawing.

Figure 7:
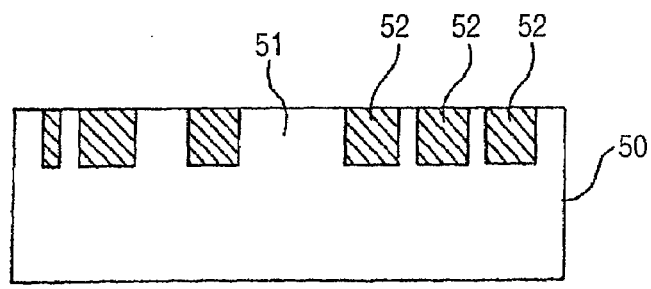
FIG. 7 is a cross-sectional view of a magnetic transfer master carrier common to Patent References 1 and 2.
Figure 7:
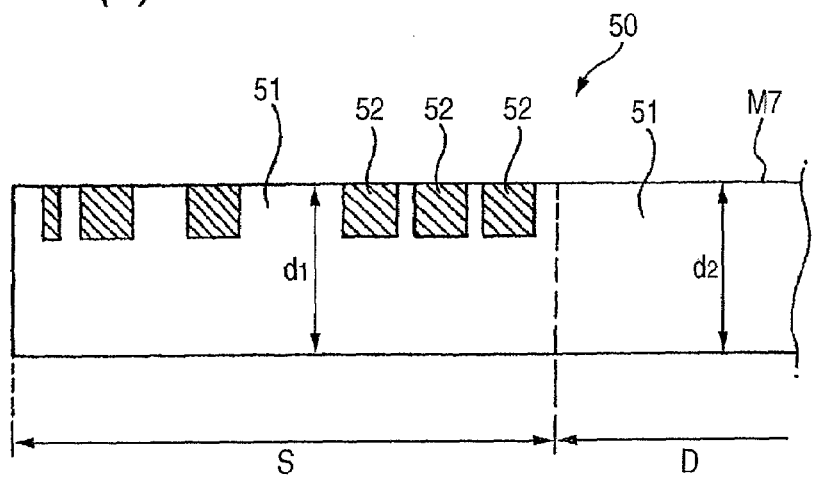

The master carrier 3, 4 in FIG. 1 is composed of a support 31, 41 with a projection pattern formed on its surface, and a soft magnetic layer 32, 42 formed on the projection pattern. In case where the support 31, 41 is formed of a ferromagnetic material such as Ni, then the support alone may attain magnetic transfer, as in FIG. 6 and FIG. 8, and it is not always necessary to coat the support with the magnetic layer 32, 42 (soft magnetic layer). However, when the magnetic layer of good transferability is formed on the support, then the coated support may ensure better magnetic transfer. When the support is formed of a non-magnetic material, like the non-magnetic support 51 in FIG. 7, then it must be coated with a magnetic layer.

On the other hand, when a ferromagnetic metal is used for the support and when a magnetic layer is formed on the projection-patterned face of the support, then it is desirable that a non-magnetic layer is formed between the support and the magnetic layer so as to block the magnetic influence of the support on the patterned magnetic layer. Further, when a protective layer of diamond-like carbon (DLC) or the like is formed as the uppermost layer on the magnetic layer, then it improves the contact durability of the master carrier and enables repeated magnetic transfer with the master carrier. In addition, an under layer of Si film may be formed in a mode of sputtering, below the DLC protective layer.

FIG. 2 is a view showing a basic process of magnetic transfer onto a magnetic recording medium. FIG. 2(a) indicates a step of initial DC magnetization of a slave medium by applying thereto a magnetic field in one direction of the medium; (b) indicates a step of intimately contacting the slave medium with a master carrier followed by applying a magnetic field thereto in the direction opposite to the direction of the initial DC magnetic field; and (c) indicates a condition of the slave medium after the step of magnetic transfer thereto. In FIG. 2, only the side of the lower recording layer 2d of the slave medium 2 is shown.

As in FIG. 2(a), an initial magnetic field Hin is previously applied to the slave medium 2 in one track direction thereof, and its magnetic recording layer is thereby initially magnetized (for DC demagnetization). Next, as in FIG. 2 (b), the recording layer 2d of the slave medium 2 is kept in intimate contact with the information-carrying side of the master carrier 3 in which the fine projection pattern of the support 31 is coated with a magnetic layer 32, and a transfer magnetic field Hdu is applied to them in the track direction of the slave medium 2 that is opposite to the direction of the initial magnetic field Hin for magnetic transfer between the two in that condition. As a result, as in FIG. 2(c), the information (e.g., servo signal) that corresponds to the projection pattern of the information-carrying face of the master carrier 3 is magnetically transferred onto the magnetic recording face (track) of the slave medium 2. In this, magnetic transfer from the lower master carrier 3 onto the lower recording face 2d of the slave medium 2 is described. Similarly, the upper recording face 2e of the slave medium 2 is kept in intimate contact with the upper master carrier 4 for magnetic transfer thereonto. Magnetic transfer onto the upper and lower recording faces 2d and 2e of the slave medium 2 may be effected both at a time or may be effected one by one.

When the projection pattern of the master carrier 3 is a negative pattern that is opposite to the positive projection pattern of FIG. 2, then magnetic transfer of the information may also be effected in the same manner as above, except that the direction of the initial magnetic field Hin and the direction of the transfer magnetic filed Hdu are made opposite to the above. The initial magnetic field and the transfer magnetic field must be determined, depending on the coercive force of the slave medium and the relative magnetic permeability of the master carrier and the slave medium.

The projection pattern formed on the master carrier of the first embodiment of the invention is described.

FIG. 3 is a cross-sectional view showing a condition of magnetic transfer onto a slave medium from the magnetic transfer master carrier of the first embodiment of the invention. (a) is before transfer, and (b) is during transfer.

In the drawing, M3 is a magnetic transfer master carrier of the first embodiment of the invention; S is a slave medium; S1 and S2 each are a servo pattern region; and D1 and D2 each are a data region. C3 is a projection formed in the data region, and the invention is characterized in that the projection C3 is formed of a material that differs from the material of the servo pattern region. The master support is formed of Ni here, and therefore an additional magnetic layer is not formed on the projection pattern of the support. However, for further improving the transfer property of the master carrier, a magnetic layer may be optionally formed on the support.

As will be understood from the drawing, the magnetic transfer master carrier M3 has, in the data region D1, D2 thereof, a projection C3 formed of a material that differs from the material of the servo pattern region, and the height of the projection C3 is the same as that of the projections in the servo pattern region S1, S2. When the master carrier M3 is attached to a slave medium S, then no air layer is formed between them. Accordingly, even when the magnetic transfer master carrier M3 of FIG. 3(a) is, as it is in the drawing, contacted with a slave medium and when it is pressed to degas the space between the two1 then any part of the magnetic transfer master carrier M3 is neither curved nor deformed since the projections C3 exist between the two as in FIG. 3(b).

Accordingly, the master carrier M3 is free from the high-order distortion that is caused by the contact of only the preformat signal projections with a slave medium as in FIG. 6, and ensures accurate magnetic transfer. Thus, the master carrier M3 is durable and has a long life. Moreover, since the servo pattern region S1, S2 of the master carrier has projections formed therein, the boundary between the magnetic region and the non-magnetic region is clear. Therefore, even when magnetic powder adheres to the recesses of the master carrier, it does not interfere with accurate magnetic transfer with the master carrier.

Preferably, the height of the projection in the data region is from 0.6 to 1.4 times that of the projections in the servo pattern region, preferably 0.8 to 1.2 times. If the height is lower than 0.6 times, then there will be a probability of high-order distortion of the master carrier and accurate magnetic transfer with the master carrier may be difficult. On the other hand, if the height is higher than 1.4 times, then the projections in the servo pattern region could not be accurately contacted with a slave medium and accurate magnetic transfer with the master carrier will be also difficult.

Next described is the second embodiment of the master carrier of the invention.

Figure 4:
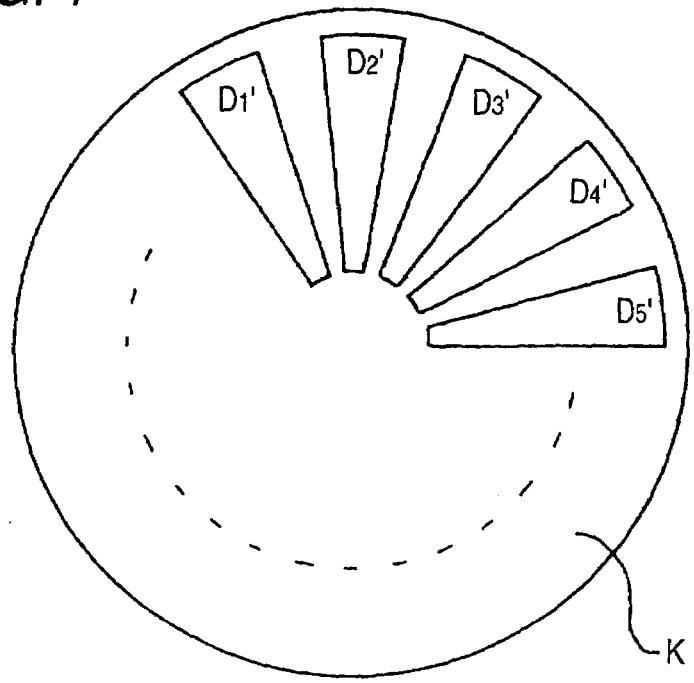
FIG. 4 is one example of a mask to be used in forming a carbon film in the data region of a master carrier.

In the second embodiment of the invention, the projection in the data region, such as carbon, is formed by a deposition. FIG. 4 is one example of a mask to be used in forming a carbon film in the data region of the master carrier of the invention.

In the drawing, K is a mask; and D1', D2', D3', D4', D5', . . . are openings through which a carbon pattern is formed in the data region of the master carrier. In the drawing, the regions are drawn wide for better visibility. In fact, however, one region has a center angle of at most about 2 degrees. The center angle of the opening D1', D2', D3', D4', D5', . . . is narrower in some degree than that of the data region D1, D2, D3, D4, D5, . . . in the magnetic transfer master carrier M5 shown in FIG. 5 (the reasons for it will be described in detail in the section of the fourth embodiment of the invention).

Figure 5:
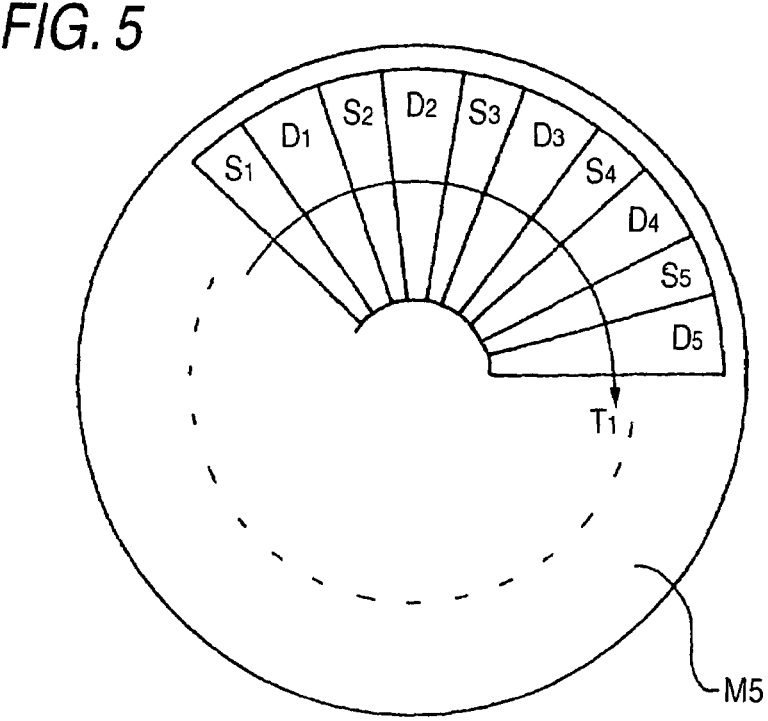
FIG. 5 is a plan view for explaining the positional relationship between a servo pattern region and a data region of a magnetic transfer master carrier.

The mask K is put on the magnetic transfer master carrier M5 of FIG. 5, and a film of a carbon layer may be formed on the master carrier M5 in a process of plasma polymerization or sputtering.

Next described is the third embodiment of the master carrier of the invention.

The third embodiment of the invention is characterized in that the data region partly has the projection, and the projection in the data region of the master carrier is formed of a non-magnetic material, especially a carbon-based material. The term "Partly" as used herein means to an extent enough to prevent the magnetic transfer master carrier from being curved and deformed. It is preferred that one or more projections are formed in 75% to 95% of an area of a data region, and most preferably one projection is formed in every data region disposed adjacent to a servo pattern. Since the projection is formed of a non-magnetic material, it acts to prevent the magnetic transfer master carrier from being curved or deformed, not having any negative influence on the operation of magnetic transfer with the master carrier. Therefore, the master carrier of this embodiment is free from the high-order distortion that is caused by the contact of only the preformat signal projections thereof with a slave medium, as in FIG. 6.

Figure 8:
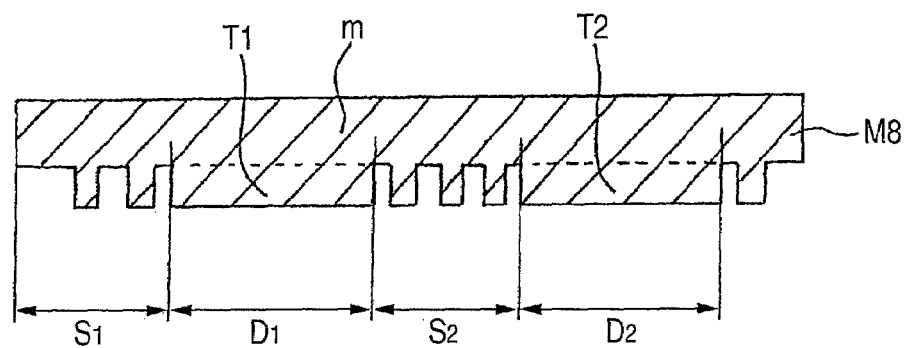
FIG. 8 is a cross-sectional view showing a condition of magnetic transfer onto a slave medium from a magnetic transfer master carrier of a related-art invention (a) is the master form before transfer; and (b) is the master form during transfer.
Figure 8:
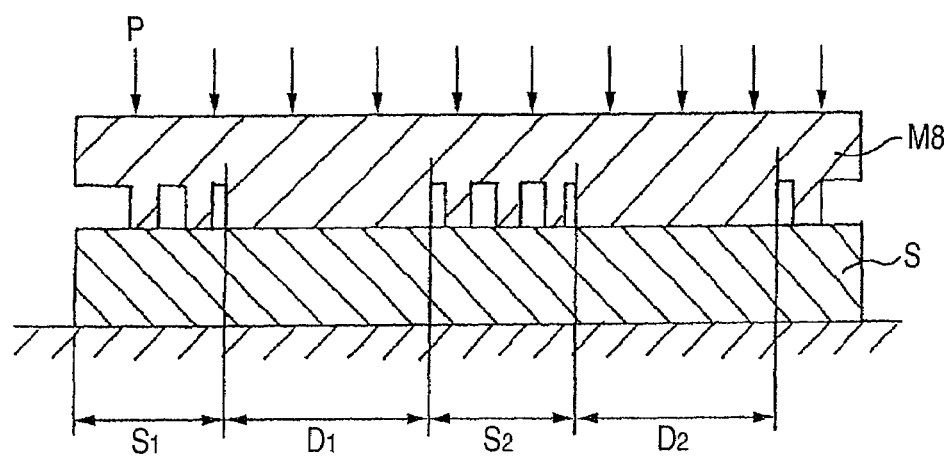

Different from the projection T1 in the data region in FIG. 8, in which the projection T1 is formed of the same material as that of the support, the projection C3 in the master carrier of this embodiment of the invention is formed of a carbon layer. Therefore, even when the lubricant that may be used in hard discs and other media serving as slave media may move into the master carrier to contaminate it, the projection C3 may absorb the contaminant owing to the ability of carbon to absorb lubricant. Thus, the projection C3 exhibits a cleaning function, and the master carrier therefore enjoys a secondary benefit in that it may be always kept clean.

Regarding the carbon material for the projection C3, for example, a carbon film or a DLC (diamond-like carbon) film may be formed under different film-forming conditions. Thus formed, the surface energy (about 60 to 65 [mN/m]) of the projection is made to differ from that of the area around the projection, and the adhesion of slave medium-derived lubricant and other contaminants to the master carrier may be reduced.

In the above-mentioned embodiment, a carbon material is used for the projection in the data region. Apart from it, a chromium-based material may also be used for it. In this case, the Cr-based thin film is more hardly peeled off from the support of the master carrier than the C-based one, and therefore, it will be more effective for preventing the master carrier from being contaminated in repeated contact thereof with slave media.

Next described is the fourth embodiment of the master carrier of the invention.

The fourth embodiment is characterized in that a non-filmed region(it may be referred to interval) is formed between the projection of the servo pattern region and that of the data region in the master carrier of the invention. In detail, the master carrier has the non-filmed region (interval) along the borderline between the projection of the servo pattern region and that of the data region. The center angle of the opening D1', D2', D3', D4', D5', . . . of the mask K of FIG. 4 is narrower in some degree than that of the data region D1, D2, D3, D4, D5, . . . in the magnetic transfer master carrier M5 of FIG. 5. Accordingly, when the magnetic transfer master carrier M5 of FIG. 5 is masked with the mask K and a film is formed thereon in a mode of plasma polymerization, then a film is not formed, for example, in the region along both edges of the fan-shaped data region D1 in the radial direction thereof, or that is, only the region along them shall be a recess with no carbon film formed therein. Such a recess continuously running from the innermost periphery toward the outermost periphery of the master carrier is formed between the preformat signal region and the projection-having data region thereof, and the recess thus formed acts to remove air that may remain between the master carrier and the slave medium attached thereto.

Accordingly, when the master carrier is kept in intimate contact with a slave medium, air that may remain between them may move through the non-filmed region of the master carrier and may be sucked away from the end thereof, and, as a result, the intimate contact between the master carrier and the slave medium may be attained more effectively. Thus improving the intimate contact between the two is more effective for preventing signal failure in magnetic transfer and for bettering the transferred signal quality.

EXAMPLES

Example 1

The master carrier produced according to the method mentioned above was tested for durability in repeated contact with slave media. Concretely, the master carrier was repeatedly contacted with a slave medium with a load of about 120 kg is applied thereto. For the slave medium, used were ordinary hard discs (2.5 inches, 3,500 Oe).

The contact of the master carrier with hard discs was repeated 10,000 times. In the durability test, the master carrier of the invention was compared with a conventional master carrier in point of the profile of the signal output from the transferred hard discs. The output depression was seen in the transferred hard disc in about 1000 times repetition of magnetic transfer with the conventional master carrier, but no output depression was seen in the transferred hard disc even after about 6,000 times repetition of magnetic transfer with the master carrier of the invention.

This confirms that the invention is effective for improving the quality and the durability of magnetic recording media.

As described hereinabove, the invention provides a durable master carrier for magnetic transfer having a long life, which enables good magnetic transfer onto slave media with no signal failure of magnetic information to be transferred onto them. Another advantage of the master carrier is that it has a cleaning function of absorbing a lubricant released from a slave medium attached thereto. Still another advantage is that, when it is attached to a slave medium, air hardly remains between them.

The present invention is not limited to the specific above-described embodiments. It is contemplated that numerous modifications may be made to the present invention without departing from the spirit and scope of the invention as defined in the following claims.

What is claimed is:

1. A master carrier for magnetic transfer, comprising:
   a data region and
   a servo pattern region that has a pattern comprising a first projection and unfilled depressions between projections, at least said first projection consisting of a first material comprising a soft magnetic material and being allayed in a track direction of said master carrier in accordance with a preformat signal information to be transferred to an in-plane magnetic recording medium,
   wherein said data region is partly filled by a second projection consisting of a second material comprising a non-magnetic material, and said second material is different from said first material.

2. The master carrier for magnetic transfer as claimed in claim 1, wherein said second material comprises a carbon based material or a chromium based material.

3. The master carrier for magnetic transfer as claimed in claim 1, wherein said second projection is formed by a deposition.

4. The master carrier for magnetic transfer as claimed in claim 1, said second projection substantially has same height as that of said first projection.

5. The master carrier for magnetic transfer as claimed in claim 1, wherein said second projection is 0.6 to 1.4 times as high as said first projection.

6. The master carrier for magnetic transfer as claimed in claim 1, wherein said second projection is 0.8 to 1.2 times as high as said first projection.

7. The master carrier for magnetic transfer as claimed in claim 1, which has an interval along a border line between said servo pattern region and said data region disposed adjacent to each other.

8. A process of producing a preformatted magnetic recording medium, which comprises the steps of:
   preparing a magnetic transfer master,
   preparing a slave medium comprising a non-magnetic support having a magnetic recording layer thereon,
   initially magnetizing said magnetic recording layer of said slave medium to a predetermined direction,
   bringing a surface of said master medium into intimate contact with said magnetic recording layer of said slave medium at a predetermined pressure to form a conjoined body, and
   applying a transfer magnetic field to said conjoined body in a direction opposite to said predetermined direction, thereby obtaining said magnetic recording medium having said recorded data,
   wherein said magnetic transfer master comprises a data region and a servo pattern region that has a pattern comprising a first projection and unfilled depressions between projections, at least said first projection consisting of a first material comprising a soft magnetic material and being allayed in a track direction of said master carrier in accordance with a preformat signal information to be transferred to an in-plane magnetic recording medium,
   wherein said data region is partly filled by a second projection consisting of a second material comprising a non-magnetic material, and said second material is different from said first material.

9. The process of producing a preformatted magnetic recording medium according to claim 8, wherein said second material comprises a carbon based material or a chromium based material.

10. The process of producing a preformatted magnetic recording medium according to claim 8, wherein said second projection is formed by a deposition.

11. The process of producing a preformatted magnetic recording medium according to claim 8, said second projection substantially has same height as that of said first projection.

12. The process of producing a preformatted magnetic recording medium according to claim 8, wherein said second projection is 0.6 to 1.4 times as high as said first projection.

13. The process of producing a preformatted magnetic recording medium according to claim 8, wherein said second projection is 0.8 to 1.2 times as high as said first projection.

14. The process of producing a preformatted magnetic recording medium according to claim 8, wherein said magnetic transfer master has an interval along a border line between said servo pattern region and said data region disposed adjacent to each other.

* * * * *